US010903676B2

(12) United States Patent
Cho et al.

(10) Patent No.: US 10,903,676 B2
(45) Date of Patent: Jan. 26, 2021

(54) SEMICONDUCTOR DEVICE

(71) Applicant: Samsung Electronics Co., Ltd., Suwon-si (KR)

(72) Inventors: Sung Kyu Cho, Hwaseong-si (KR); Hyoung Seok Oh, Seoul (KR); Kwang Chan Lee, Hwaseong-si (KR); Dae Woong Cho, Yongin-si (KR); Jung Wook Heo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 386 days.

(21) Appl. No.: 15/867,893

(22) Filed: Jan. 11, 2018

(65) Prior Publication Data

US 2018/0301911 A1 Oct. 18, 2018

(30) Foreign Application Priority Data

Apr. 17, 2017 (KR) ........................ 10-2017-0048913

(51) Int. Cl.

*H02J 7/00* (2006.01)
*H02M 3/158* (2006.01)
*H02M 3/22* (2006.01)
*H02M 1/00* (2006.01)

(52) U.S. Cl.

CPC ................ *H02J 7/008* (2013.01); *H02J 7/00* (2013.01); *H02M 3/158* (2013.01); *H02M 3/22* (2013.01); *H02J 2207/20* (2020.01); *H02M 2001/0048* (2013.01); *Y02B 40/00* (2013.01)

(58) Field of Classification Search

CPC ........ H02J 7/00; H02J 2207/20; H02J 7/0071; H02J 7/007; H02M 3/22; H02M 3/158; H02M 2001/0048; Y02B 40/90

USPC .......................................................... 320/163

See application file for complete search history.

(56) References Cited

U.S. PATENT DOCUMENTS

| | | | | |
|---|---|---|---|---|
| 7,656,129 | B2 * | 2/2010 | Banta | E06B 9/56 320/141 |
| 8,339,105 | B2 * | 12/2012 | Maleyran | H02J 1/10 320/138 |
| 9,136,725 | B2 | 9/2015 | Cha | |
| 9,178,380 | B2 * | 11/2015 | Kawai | H02J 7/045 |
| 9,391,467 | B2 | 7/2016 | Zhao et al. | |
| 9,444,281 | B2 | 9/2016 | Yoshimoto et al. | |
| 9,634,502 | B2 * | 4/2017 | Von Novak, III | H02J 7/00 |
| 9,748,788 | B2 * | 8/2017 | Sporck | H02J 7/00 |
| 10,396,582 | B2 * | 8/2019 | Yi | H02J 7/007184 |
| 2004/0004458 | A1 * | 1/2004 | Tanaka | H02J 7/022 320/106 |

(Continued)

FOREIGN PATENT DOCUMENTS

KR 20100032961 A 3/2010

*Primary Examiner* — M Baye Diao
(74) *Attorney, Agent, or Firm* — Harness, Dickey & Pierce, P.L.C.

(57) ABSTRACT

The semiconductor device including first and second transistors configured to provide a first voltage to a first node, the first voltage being a voltage provided from a travel adaptor (TA), a third transistor connected in series with the second transistor and configured to provide a ground voltage to the first node, and a fourth transistor configured to receive a second voltage from a first inductor connected to the first node, and provide the second voltage to a second node as a third voltage for charging a battery connected thereto may be provided.

17 Claims, 15 Drawing Sheets

50 TA
11 OVP
100
MT1
MQ1
MQ2 MT2
LX1 $L_M$
MQ3 MT3
$C_M$
VSYS
MQ4 MT4
VBAT
20 BATTERY
120
S1_T1
S1_Q1
S1_Q2 S1_T2
LX2 $L_{S1}$
S1_Q3 S1_T3
$C_{S1}$

(56) References Cited

U.S. PATENT DOCUMENTS

| | | | | |
|---|---|---|---|---|
| 2005/0275372 | A1* | 12/2005 | Crowell | H02J 7/0018 320/112 |
| 2011/0248670 | A1 | 10/2011 | Yamazaki et al. | |
| 2012/0206101 | A1* | 8/2012 | Shilimkar | H02J 7/00 320/112 |
| 2013/0063079 | A1* | 3/2013 | Kawai | H02J 7/045 320/107 |
| 2013/0175978 | A1 | 7/2013 | Hsiao | |
| 2015/0208486 | A1 | 7/2015 | Yoon | |
| 2016/0049803 | A1* | 2/2016 | Hsu | H02J 7/045 320/162 |
| 2016/0056651 | A1* | 2/2016 | Von Novak, III | H02J 7/00 320/114 |
| 2016/0087472 | A1 | 3/2016 | Sattinger et al. | |
| 2017/0222461 | A1* | 8/2017 | Kung | G06F 9/44505 |

* cited by examiner

12
MT1
MQ1
MT2
MQ2
MT3
MQ3
MT4
MQ4
LX
L
C
VSYS
VBAT
20
BATTERY
11
OVP
50
TA $I_{CHG}$
$I_{SET\_MAX}$
$I_{SET\_MIN}$
t
$V_{BAT}$
t
T1
T2
T3
T4
T5
T6

SEMICONDUCTOR DEVICE

This application claims priority to Korean Patent Application No. 10-2017-0048913, filed on Apr. 17, 2017, and all the benefits accruing therefrom under 35 U.S.C. § 119, the disclosure of which is incorporated herein by reference in its entirety.

BACKGROUND

1. Field

The present disclosure relates to a semiconductor device, and more particularly, to a semiconductor device (e.g., a charger) for charging a battery.

2. Description of the Related Art

Mobile or portable devices use batteries to be supplied with power. To charge the batteries, various methods (e.g., a direct charging method or a switching charging method) are used. The direct charging method is generally more efficient than the switching charging method.

In a case where only the direct charging method is used, there may be a limit in controlling a constant voltage. Thus the switching charging method may be used together with the direct charging method. However, if a direct charger and a switching charger are implemented as separate circuitry, the size of the product may increase.

SUMMARY

Some example embodiments of the present disclosure provide a semiconductor device capable of improving charging efficiency, and reducing generation of heat therein and the size thereof.

Some example embodiments of the present disclosure also provide a semiconductor device capable of charging a battery at a relatively high speed.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to an example embodiment of the present disclosure, a semiconductor device may include first and second transistors configured to provide a first voltage to a first node, the first voltage being a voltage provided from a travel adaptor (TA), a third transistor connected in series with the second transistor and configured to provide a ground voltage to the first node, and a fourth transistor configured to receive a second voltage from a first inductor connected to the first node, and provide the second voltage to a second node as a third voltage for charging a battery connected thereto According to an example embodiment of the present disclosure, a semiconductor device includes a first charger configured to perform direct charging on a battery using a first voltage provided from an external power source, a second charger configured to perform direct charging on the battery, in parallel to the first charger, using the first voltage. The first voltage may be raised or lowered under a control of an external device.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail some example embodiments thereof with reference to the attached drawings, in which.

DETAILED DESCRIPTION

Figure 1:
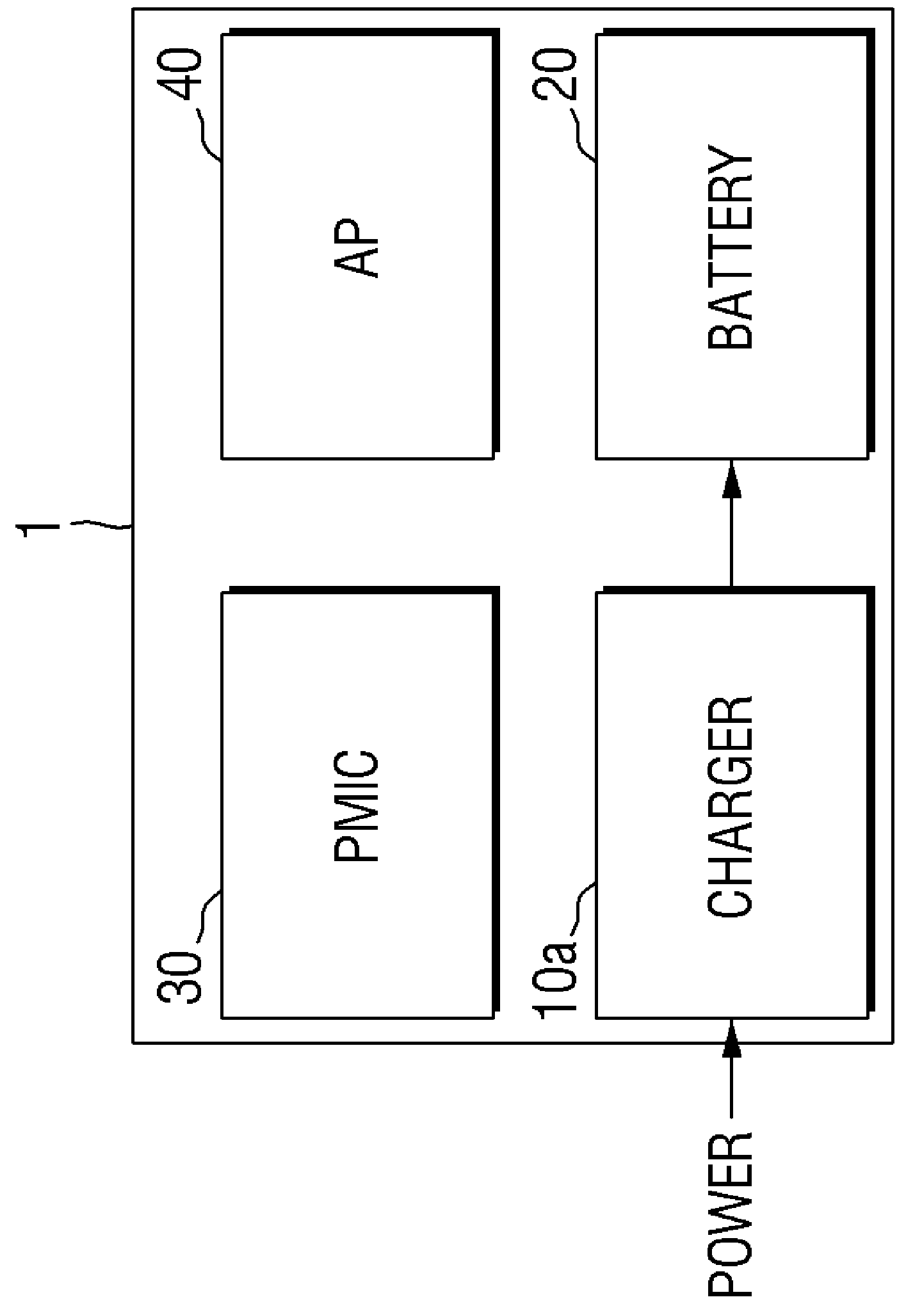
FIG. 1 is a block diagram of a semiconductor system according to an example embodiment.

FIG. 1 is a block diagram of a semiconductor system according to an example embodiment.

Referring to FIG. 1, a semiconductor system 1 includes a semiconductor device 10*a*, a battery 20, a power management integrated circuit (PMIC) 30, and an application processor (AP) 40.

The semiconductor device 10*a* is provided with power from an external source and includes a charger for charging the battery 20. The semiconductor device 10*a* may include circuitry for transmitting power to the battery 20, the PMIC 30, and the like in the semiconductor system 1.

In some example embodiments, the semiconductor device 10*a* may be provided with power from, for example, a travel adaptor (TA) or a universal serial bus (USB) power source, but the present disclosure is not limited thereto.

In some example embodiments, the semiconductor device 10*a* may charge the battery 20 using various methods (e.g., a normal charging method, a fast charging method, or a direct charging method). The normal charging method and the fast charging method may be implemented in a switching charging method, and the direct charging method may be implemented by directly connecting the battery 20 to a TA.

The normal charging method, which supports a charging capacity of, for example, 5 W to 15 W, and the fast charging method, which supports a charging capacity of, for example, 15 W to 20 W, have a charging efficiency of about 90%, and the direct charging method has a charging efficiency of about 96% to about 98%. The direct charging method causes less heat dissipation. However, if the direct charging method is used alone, there may be a limit in controlling a constant voltage. Thus, the switching charging method may be used together with the direct charging method.

The semiconductor device 10*a* may include a switching charger, which operates according to the switching charging method, and a direct charger, which operates according to the direct charging method, as a single charger. Thus, the size of the semiconductor device 10*a* and heat generated by the semiconductor device 10*a* during battery charging may be reduced. Further, the semiconductor device 10*a* may be configured to include a plurality of chargers. Thus, battery charging time may be reduced.

The battery 20 may be embedded in the semiconductor system 1 and may supply power to various elements of the semiconductor system 1, including the AP 40, thereby making the semiconductor system 1 portable.

In some example embodiments, the battery 20 may be a nickel (Ni)-cadmium (Cd) battery, a Ni-metal hydride (MH) battery, a lithium (Li) ion battery, or the like, but the present disclosure is not limited thereto.

The PMIC 30 may perform power management for various elements of the semiconductor system 1. For example, the PMIC 30 may control the supply of power to various elements of the semiconductor system 1, including the AP 40, according to a desired (or alternatively, predetermined) policy in order to increase the power efficiency of the semiconductor system 1. For example, the PMIC 30 may place the semiconductor system 1 in a sleep mode or may wake up the semiconductor system 1 from the sleep mode, as desired.

The AP 40 may control the semiconductor system 1. In some example embodiments, the AP 40 may be implemented as a System-on-Chip (SoC) including at least one Intellectual Property (IP).

In some example embodiments, in a case where the semiconductor device 10*a* is provided with power from a TA, the AP 40 may communicate with the TA and determine the level of a voltage output from the TA, and then input to the semiconductor device 10*a*.

Figure 2:
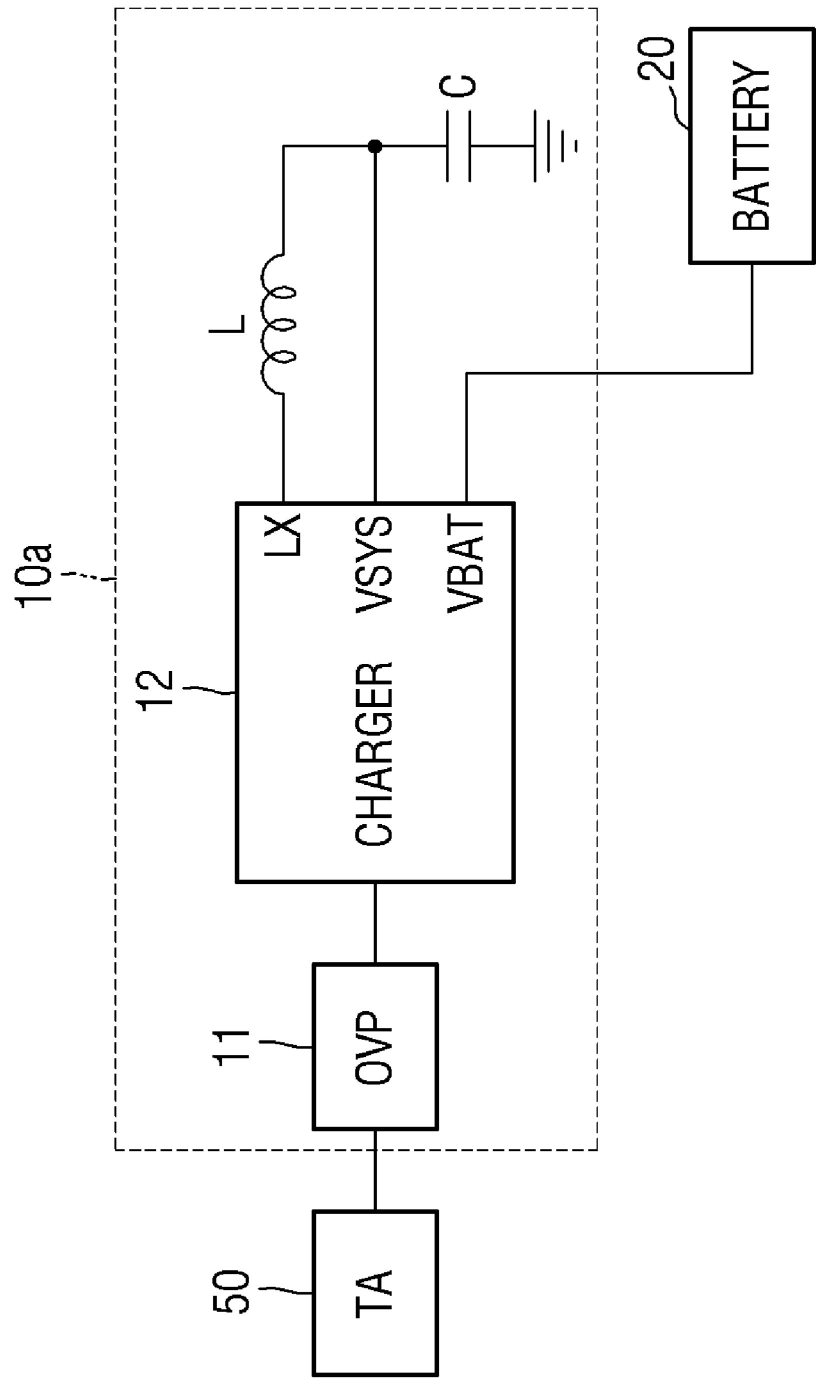
FIG. 2 is a block diagram of a semiconductor device according to an example embodiment.

FIG. 2 is a block diagram of a semiconductor device according to an example embodiment.

Referring to FIG. 2, a semiconductor device 10*a* may be provided with power from a TA 50, and include an over-voltage protection (OVP) circuit 11, a charger 12, and an inductor L.

In a case where a voltage provided from the TA 50 is an over-voltage, the OVP circuit 11 may cut off electrical connection to the charger 12 to prevent damage to the internal circuitry of the semiconductor device 10*a*, including the charger 12. Although FIG. 2 illustrates that the OVP circuit 11 is provided in the semiconductor device 10*a*, the OVP circuit 11 may not be provided depending on the purpose of implementation of the semiconductor device 10*a*, or may be provided at a different location from that illustrated in FIG. 2.

The charger 12 may include a plurality of terminals. For example, the charger 12 may include a terminal providing a first voltage $V_{TA}$ provided from the TA 50 to a node LX through the OVP circuit 11, a terminal connected to a second node VSYS, which receives a second voltage $V_{SYS}$ from the node LX through the inductor L, and a terminal outputting a third voltage $V_{BAT}$ through a third node VBAT for charging the battery 20.

The second node VSYS may be connected to a load such as, for example, the PMIC 30.

The semiconductor device 10*a* may alternately perform switching charging and direct charging. For example, the semiconductor device 10*a* may perform switching charging, including normal charging and fast charging, and then may perform direct charging if a desired (or alternatively, predetermined) set of conditions are met. The operation of the semiconductor device 10*a* will hereinafter be described with reference to FIGS. 3 and 4.

Figure 3:
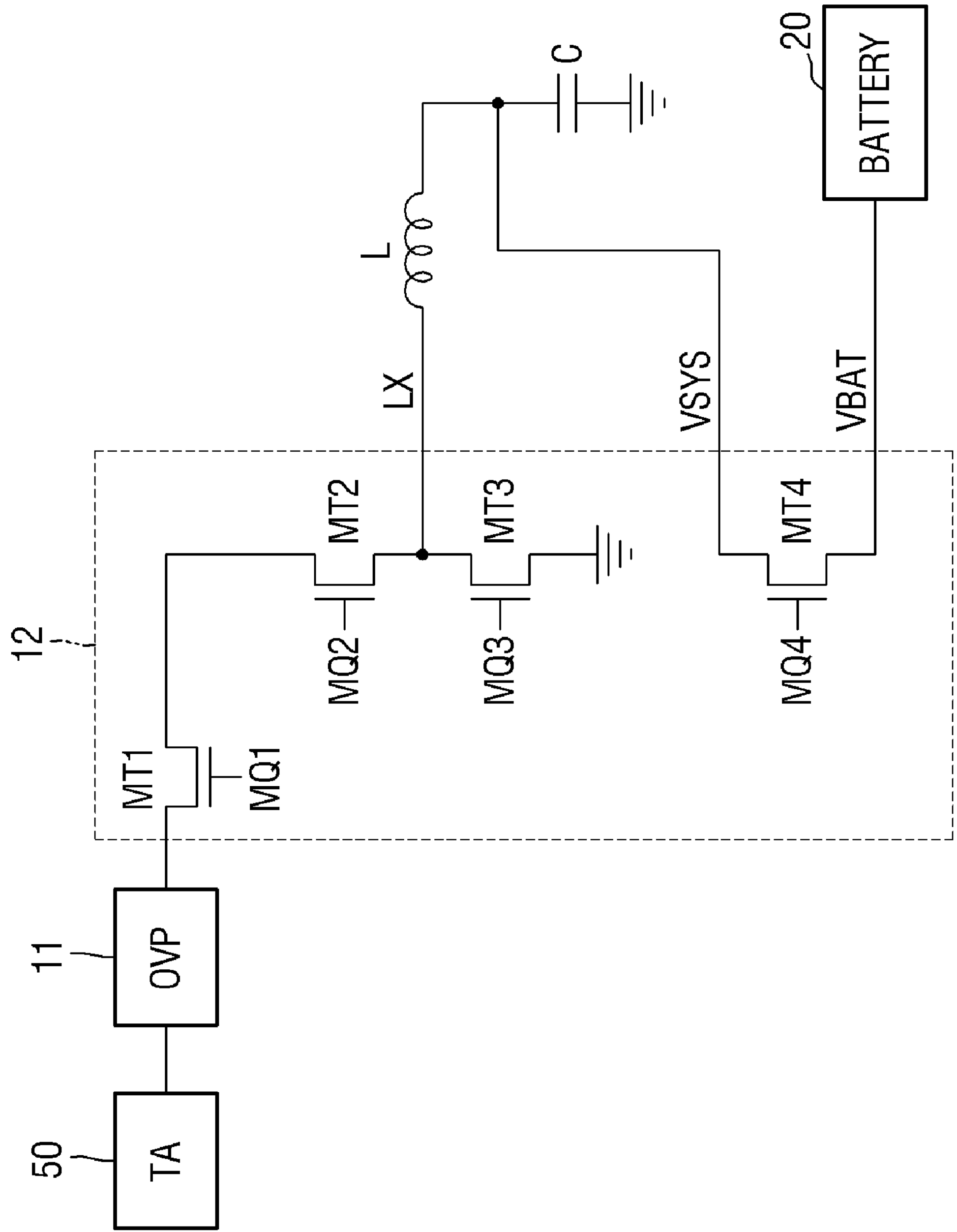
FIG. 3 is a circuit diagram of the semiconductor device of FIG. 2 according to an example embodiment.
Figure 4:
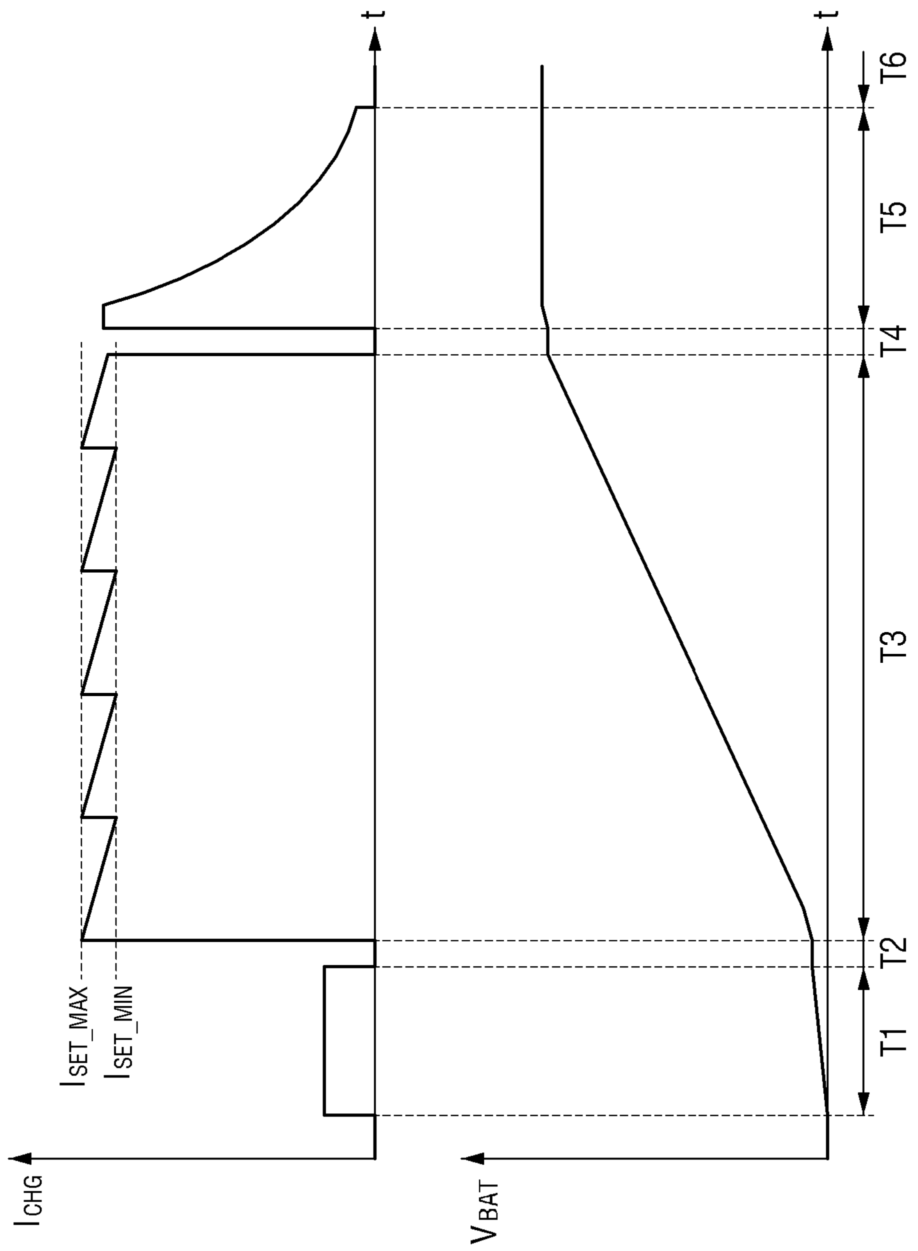
FIG. 4 is a diagram illustrating an operation of the semiconductor device of FIG. 2 according to an example embodiment.

FIG. 3 is a circuit diagram of the semiconductor device of FIG. 2 according to an example embodiment. FIG. 4 is a diagram illustrating an operation of the semiconductor device of FIG. 2 according to an example embodiment.

Referring to FIG. 3, the charger 12 may include a first transistor MT1, a second transistor MT2, a third transistor MT3, and a fourth transistor MT4.

The first and second transistors MT1 and MT2 may be gated by signals MQ1 and MQ2, respectively, and may provide the first voltage $V_{TA}$ provided from the TA 50 to the node LX. The first and second transistors MT1 and MT2 may be connected in series with each other.

The third transistor MT3 may be connected in series with the second transistor MT2. The third transistor MT3 may be gated by a signal MQ3, and may provide a ground voltage to the node LX.

The fourth transistor MT4 receives the second voltage $V_{SYS}$ from the inductor L, which is connected to the node LX, through the second node VSYS. The fourth transistor MT4 may be gated by a signal MQ4, and may provide the second voltage $V_{SYS}$ to a third node VBAT as the third voltage $V_{BAT}$ for charging the battery 20.

In this case, a current provided from the TA 50 may delivered to the battery 20 through the first transistor MT1, the second transistor MT2, the inductor L, and the fourth transistor MT4, thereby charging the battery 20.

The first voltage $V_{TA}$ provided from the TA 50 may be adjusted under the control of the AP 40. Accordingly, the charger 12 may operate as a direct charger for directly charging the battery 20 using an adjusted first voltage $V_{TA}$.

For example, the charger 12 may operate as a switching charger, which charges the battery 20 in a switching charging method, by controlling the signals MQ2 and MQ3 to turn on the second and third transistors MT2 and MT3. Further, the charger 12 may operate as a direct charger using a variable first voltage $V_{TA}$ by controlling the signals MQ1 through MQ4 to turn on the first, second, and fourth transistors MT1, MT2, and MT4 and turn off the third transistor MT3 such that the TA 50 is directly connected to the battery 20.

Referring to FIG. 4, during a period T1, the semiconductor device 10*a* may perform switching charging using normal charging or fast charging. Accordingly, a charging current $I_{CHG}$ is supplied to the battery 20, and as a result, a battery voltage $V_{BAT}$ of the battery 20 (e.g., the third voltage) increases.

During the period T1, the AP 40 may determine whether the battery voltage $V_{BAT}$ of the battery 20 is within a directly chargeable range.

For example, the AP 40 may determine whether the battery 20 is directly chargeable, based on whether the battery voltage $V_{BAT}$ of the battery 20 is in the range of voltages between a desired (or alternatively, predetermined) minimum battery voltage $VBAT_{SET\_MIN}$ and a desired (or alternatively, predetermined) maximum battery voltage $VBAT_{SET\_MAX}$.

During a period T2, in response to the battery voltage $V_{BAT}$ of the battery 20 being determined to be within the directly chargeable range, the AP 40 may prepare for direct charging of the battery 20 by, for example, operating the charger 12 and initializing the first voltage $V_{TA}$ provided from the TA 50.

In some example embodiments, the AP 40 may set a level of the first voltage VTA provided from the TA 50 to be as high as the battery voltage $V_{BAT}$ of the battery 20.

During a period T3, the charger 12 may perform direct charging on the battery 20. While the charger 12 is performing direct charging on the battery 20, the AP 40 may continue to adjust the first voltage $V_{TA}$ provided from the TA 50.

For example, if an input current $I_{IN}$ provided from the TA 50 is lower than a desired (or alternatively, predetermined) minimum current $I_{SET\_MIN}$, the first voltage $V_{TA}$ may be raised. On the other hand, if the input current $I_{IN}$ provided from the TA 50 is higher than a desired (or alternatively, predetermined) maximum current $I_{SET\_MAX}$, the first voltage $V_{TA}$ may be lowered.

In another example, if the sum of a charging current $I_{CHG}$ provided to the battery 20 and a load current $I_{SYS}$ provided to the second node VSYS is lower than the desired (or alternatively, predetermined) minimum current $I_{SET\_MIN}$, the first voltage $V_{TA}$ may be raised. On the other hand, if the sum of the charging current $I_{CHG}$ provided to the battery 20 and the load current $I_{SYS}$ provided to the second node VSYS is higher than a desired (or alternatively, predetermined) maximum current $I_{SET\_MAX}$, the first voltage $V_{TA}$ may be lowered.

During a period T4, in response to the charging voltage of the charger 12 reaching a desired (or alternatively, predetermined) maximum battery voltage $VBAT_{SET\_MAX}$, the AP 40 may end direct charging by terminating the operation of the charger 12, and may switch back the semiconductor device 10*a* to switching charging mode.

During a period T5, constant voltage charging or constant current charging may be performed on the battery 20. During a period T6, the charging of the battery 20 may be completed.

In this manner, the generation of heat during battery charging and battery charging time can be reduced by using both direct charging and switching charging.

Figure 5:
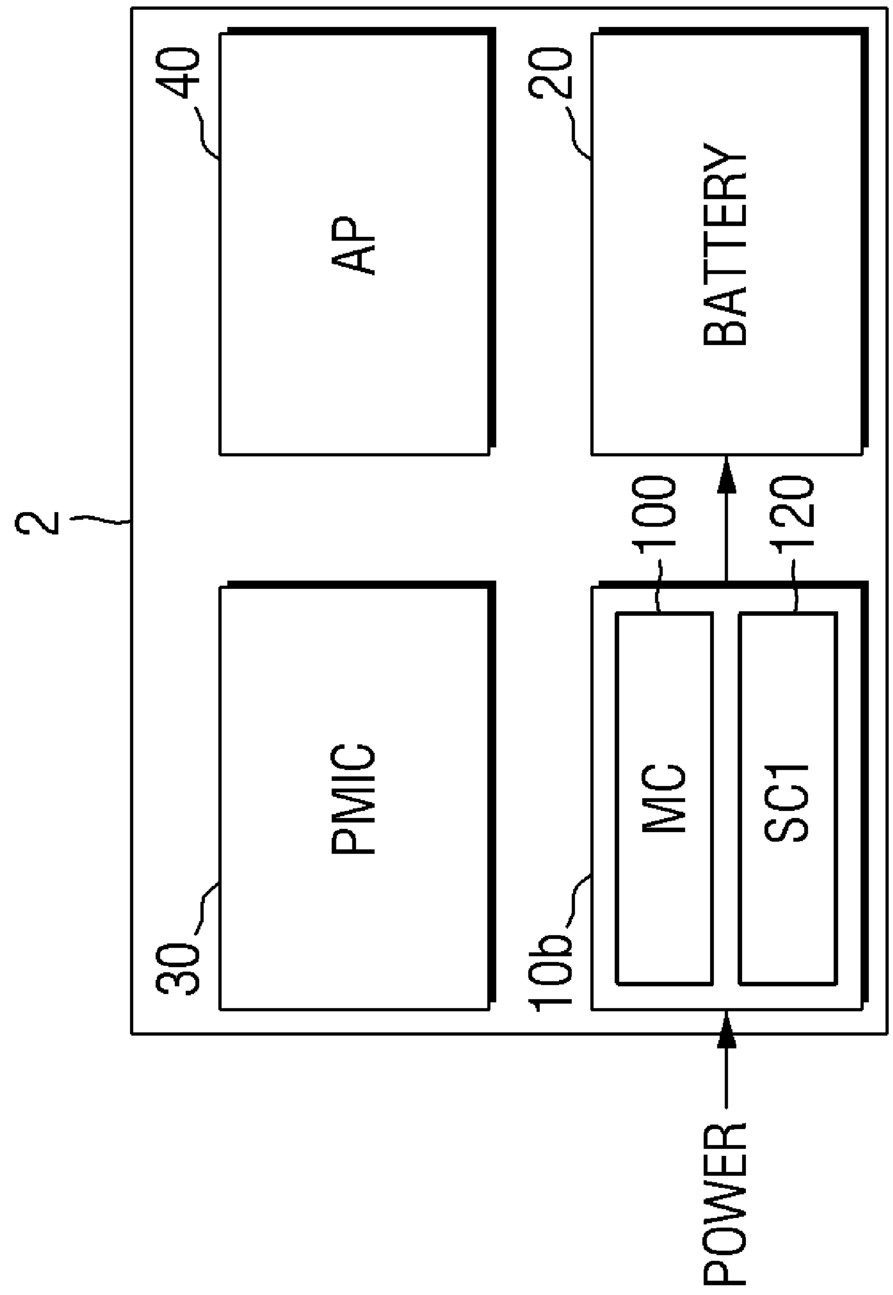
FIG. 5 is a block diagram of a semiconductor system according to another example embodiment.

FIG. 5 is a block diagram of a semiconductor system according to another example embodiment.

Referring to FIG. 5, a semiconductor system 2 may include a semiconductor device 10*b*, a battery 20, a PMIC 30, and an AP 40.

The example embodiment of FIG. 5 will hereinafter be described, focusing mainly on differences from the example embodiment of FIG. 1.

The semiconductor device 10*b* may be provided with power from an external source and include a main charger (MC) 100 and a first sub-charger (SC1) 120, both of which are configured to charge the battery 20.

The main charger 100 and the first sub-charger 120 may operate in parallel. For example, the main charger 100 may perform charging on the battery 20 first, and then the first sub-charger 120 may perform charging on the battery 20 separately. While the first sub-charger 120 is performing charging on the battery 20, the main charger 100 may terminate the charging of the battery 20.

Figure 6:
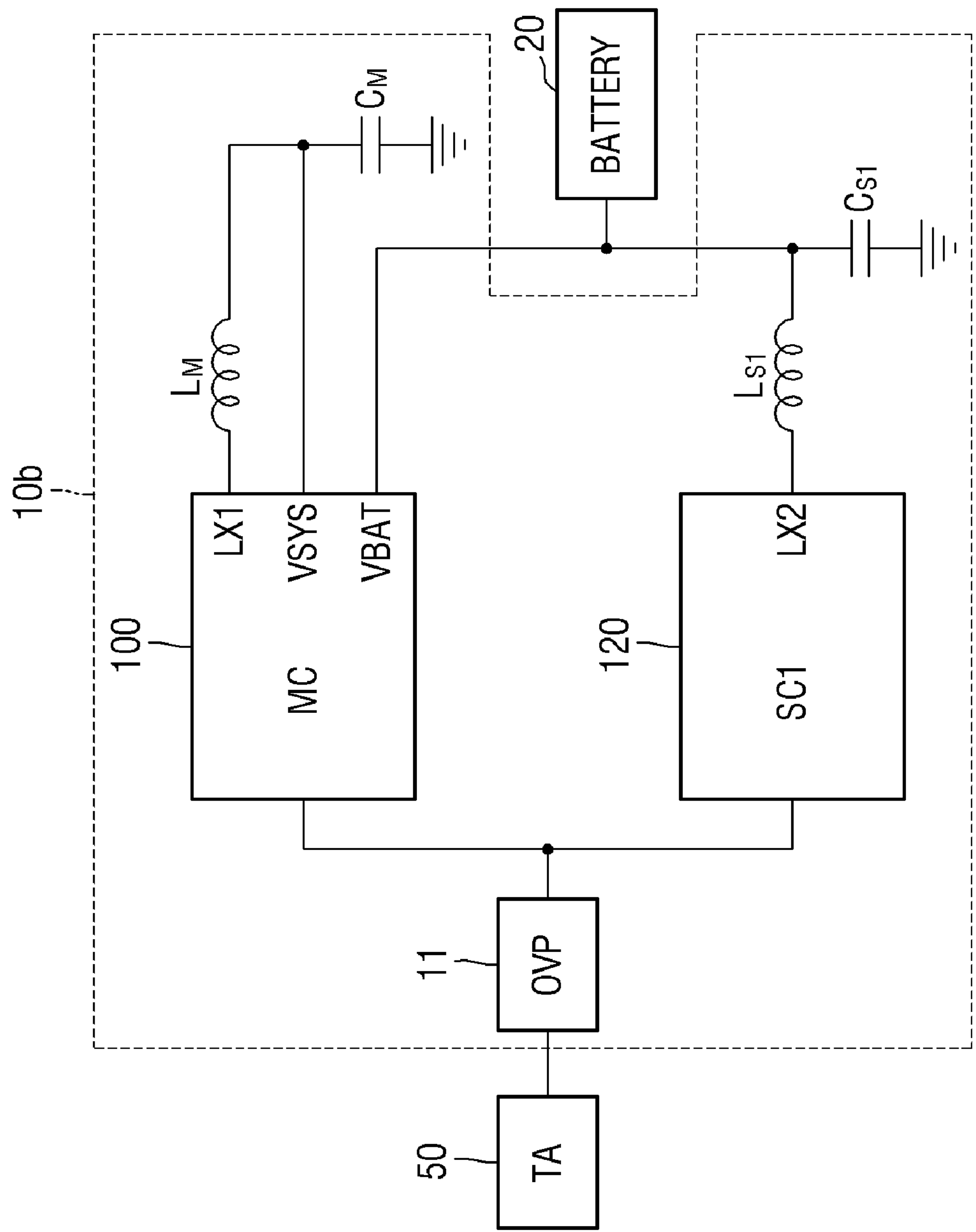
FIG. 6 is a block diagram of a semiconductor device according to another example embodiment.

FIG. 6 is a block diagram of a semiconductor device according to another example embodiment.

Referring to FIG. 6, a semiconductor device 10*b* may be provided with power from a TA 50, and include an OVP circuit 11, a main charger (MC) 100, a first inductor $L_M$, a first sub-charger (SC1) 120, and a second inductor $L_{S1}$.

As mentioned earlier with reference to FIG. 2, the OVP circuit 11 may not be provided depending on the purpose of implementation of the semiconductor device 10*b*, or may be provided at a different location from that illustrated in FIG. 6.

The main charger 100 may include a plurality of terminals. For example, the main charger 100 may include a terminal providing a first voltage $V_{TA}$ provided from the TA 50 to a first node LX1 through the OVP circuit 11, a terminal connected to a second node VSYS, which receives a second voltage $V_{SYS}$ from the first node LX1 through the first inductor $L_M$, and a terminal outputting a third voltage $V_{BAT}$ for charging the battery 20.

The second node VSYS may be connected to a load such as, for example, the PMIC 30.

The first sub-charger 120 may include at least one terminal. For example, the first sub-charger 120 may include a terminal providing the first voltage $V_{TA}$ provided from the TA 50 to a fourth node LX2 through the OVP circuit 11.

The voltage output from the fourth node LX2 may be provided to the battery 20 through the second inductor $L_{S1}$, which is connected between the fourth node LX2 and a third node VBAT.

The semiconductor device 10*b* may alternately perform switching charging and direct charging. For example, the semiconductor device 10*b* may perform switching charging, including normal charging and fast charging, and then may perform direct charging if a desired (or alternatively, predetermined) set of conditions are met. The operation of the semiconductor device 10*b* will hereinafter be described with reference to FIGS. 7 and 8.

Figure 7:
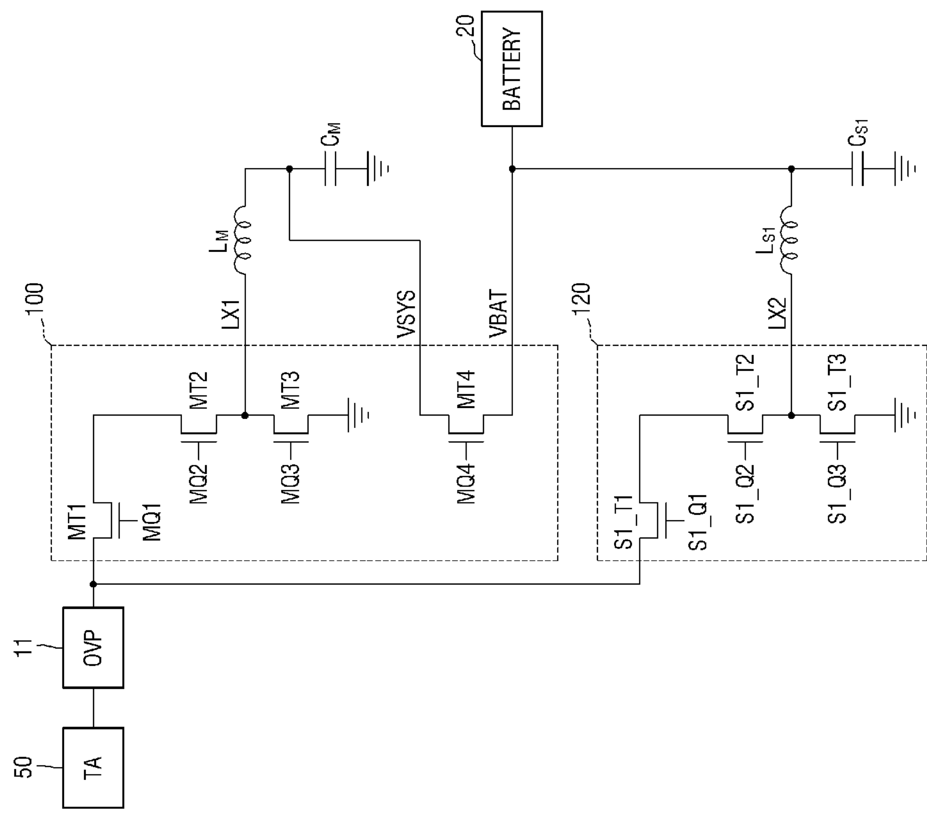
FIG. 7 is a circuit diagram of the semiconductor device of FIG. 6 according to an example embodiment.
Figure 8:
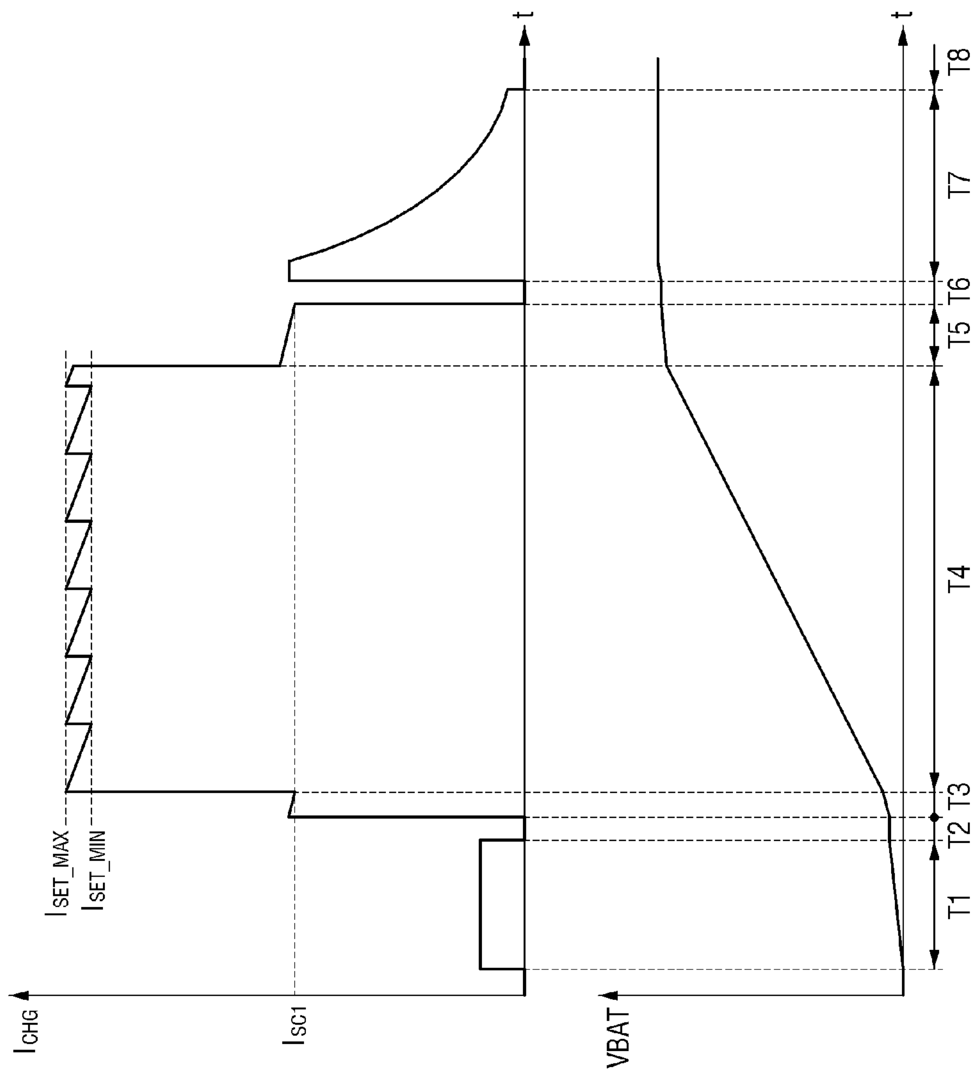
FIG. 8 is a diagram illustrating an operation of the semiconductor device of FIG. 6 according to an example embodiment.

FIG. 7 is a circuit diagram of the semiconductor device of FIG. 6 according to an example embodiment. FIG. 8 is a diagram illustrating an operation of the semiconductor device of FIG. 6 according to an example embodiment.

Referring to FIG. 7, the main charger 100 may include a first transistor MT1, a second transistor MT2, a third transistor MT3, and a fourth transistor MT4.

The first and second transistors MT1 and MT2 may be gated by signals MQ1 and MQ2, respectively, and may provide the first voltage $V_{TA}$ provided from the TA 50 to the first node LX1. The first and second transistors MT1 and MT2 may be connected in series to each other.

The third transistor MT3 may be connected in series with the second transistor MT2. The third transistor MT3 may be gated by a signal MQ3, and may provide a ground voltage to the first node LX1.

The fourth transistor MT4 may receive the second voltage $V_{SYS}$ from the first inductor $L_M$, which is connected to the first node LX1, through the second node VSYS. The fourth transistor MT4 may be gated by a signal MQ4, and may provide the second voltage $V_{SYS}$ to the third node VBAT as the third voltage $V_{BAT}$ for charging the battery 20.

A current provided from the TA 50 may be delivered to the battery 20 through the first transistor MT1, the second transistor MT2, the first inductor $L_M$, and the fourth transistor MT4, thereby charging the battery 20.

The first sub-charger 120 may include a fifth transistor S1_T1, a sixth transistor S1_T2, and a seventh transistor S1_T3.

The fifth and sixth transistors S1_T1 and S1_T2 may be gated by signals S1_Q1 and S1_Q2, respectively, and may provide the first voltage $V_{TA}$ provided from the TA 50 to the fourth node LX2. The fifth and sixth transistors S1_T1 and S1_T2 may be connected in series with each other.

The seventh transistor S1_T3 may be connected in series with the sixth transistor S1_T2. The seventh transistor S1_T3 may be gated by a signal S1_Q3, and may provide the ground voltage to the fourth node LX2.

The current provided from the TA 50 may be delivered to the battery 20 through the fifth transistor S1_T1, the sixth transistor S1_T2, and the second inductor $L_{S1}$, thereby charging the battery 20.

The first voltage $V_{TA}$ provided from the TA 50 may be adjusted under the control of the AP 40, and the main charger 100 and the first sub-charger 120 may operate as direct chargers for directly charging the battery 20 using an adjusted first voltage $V_{TA}$.

For example, the main charger 100 may operate as a switching charger, which charges the battery 20 in a switching charging method, by controlling the signals MQ2 and MQ3 to switch on the second and third transistors MT2 and MT3. Further, the main charger 100 may operate as a direct charger using a variable first voltage $V_{TA}$ by controlling the signals MQ1 through MQ4 to turn on the first, second, and fourth transistors MT1, MT2, and MT4 and to turn off the third transistor MT3, and thereby directly connecting the TA 50 to the battery 20.

The first sub-charger 120 may operate as a switching charger, which charges the battery 20 in a switching charging method, by controlling the signals S1_Q2 and S1_Q3 to switch on the sixth and seventh transistors S1_T2 and S1_T3. Further, the first sub-charger 120 may operate as a direct charger using a variable first voltage $V_{TA}$ by controlling the signals S1_Q1 through S1_Q3 to turn on the fifth and sixth transistors S1_T1 and S1_T2 and to turn off the seventh transistor S1_T3, and thereby directly connecting the TA 50 to the battery 20.

In a case where the main charger 100 and the first sub-charger 120 both perform direct charging on the battery 20, a charging current provided to the battery 20 may include a first charging current, provided along a first path including the first transistor MT1, the second transistor MT2, the first inductor $L_M$, and the fourth transistor MT4, and a second charging current, provided along a second path including the fifth transistor S1_T1, the sixth transistor S1_T2, and the second inductor $L_{S1}$.

Referring to FIG. 8, during a period T1, the semiconductor device 10*b* may perform switching charging using normal charging or fast charging. Accordingly, a charging current $I_{CHG}$ may be supplied to the battery 20, and as a result, the battery voltage $V_{BAT}$ (e.g., the third voltage) of the battery 20 increases.

During the period T1, the AP 40 may determine, for example, whether the battery voltage $V_{BAT}$ of the battery 20 is within a directly chargeable range.

For example, the AP 40 may determine whether the battery 20 is directly chargeable, based on whether the battery voltage $V_{BAT}$ of the battery 20 is in the range of voltages between a desired (or alternatively, predetermined) minimum battery voltage $VBAT_{SET\_MIN}$ and a desired (or alternatively, predetermined) maximum battery voltage $VBAT_{SET\_MAX}$.

During a period T2, in response to the battery voltage $V_{BAT}$ of the battery 20 being determined to be within the directly chargeable range, the AP 40 may prepare for direct charging of the battery 20 by, for example, operating the main charger 100 and initializing the first voltage $V_{TA}$ provided from the TA 50.

In some example embodiments, the AP 40 may set the first voltage $V_{TA}$ provided from the TA 50 to be as high as the battery voltage $V_{BAT}$ of the battery 20.

During periods T3 through T5, the main charger 100 may perform direct charging on the battery 20. While the main charger 100 is performing direct charging on the battery 20, the AP 40 may continue to adjust the first voltage $V_{TA}$ provided from the TA 50.

For example, if an input current $I_{IN}$ provided from the TA 50 is lower than a desired (or alternatively, predetermined) minimum current $I_{SET\_MIN}$, the first voltage $V_{TA}$ may be raised. On the other hand, if the input current $I_{IN}$ provided from the TA 50 is higher than a desired (or alternatively, predetermined) maximum current $I_{SET\_MAX}$, the first voltage $V_{TA}$ may be lowered.

In another example, if the sum of a charging current $I_{CHG}$ provided to the battery 20 and a load current $I_{SYS}$ provided to the second node VSYS is lower than the desired (or alternatively, predetermined) minimum current $I_{SET\_MIN}$, the first voltage $V_{TA}$ may be raised. On the other hand, if the sum of the charging current $I_{CHG}$ provided to the battery 20 and the load current $I_{SYS}$ provided to the second node VSYS is higher than a desired (or alternatively, predetermined) maximum current $I_{SET\_MAX}$, the first voltage $V_{TA}$ may be lowered.

During the period T4, the first sub-charger 120 may also perform direct charging on the battery 20. While the first sub-charger 120 is performing direct charging on the battery 20, the AP 40 may also continue to adjust the first voltage $V_{TA}$ provided from the TA 50. Then, in response to the charging voltage of the first sub-charger 120 reaching a desired (or alternatively, predetermined) maximum battery voltage $VBAT_{SET\_MAX}$, the AP 40 may end direct charging performed by the first sub-charger 120 by terminating the operation of the first sub-charger 120. In this case, the operation of the main charger 100 may not be terminated.

Thereafter, during a period T6, in response to the charging voltage of the main charger 100 reaching the desired (or alternatively, predetermined) maximum battery voltage $VBAT_{SET\_MAX}$, the AP 40 may end direct charging performed by the main charger 100 by terminating the operation of the main charger 100. Then, the semiconductor device 10*b* may be switched back to a switching charging mode.

During a period T7, constant voltage charging or constant current charging may be performed on the battery 20. During a period T8, the charging of the battery 20 may be completed.

In this manner, the generation of heat during battery charging can be reduced by using both direct charging and switching charging, and battery charging time can be reduced by performing direct charging using multiple chargers.

Figure 9:
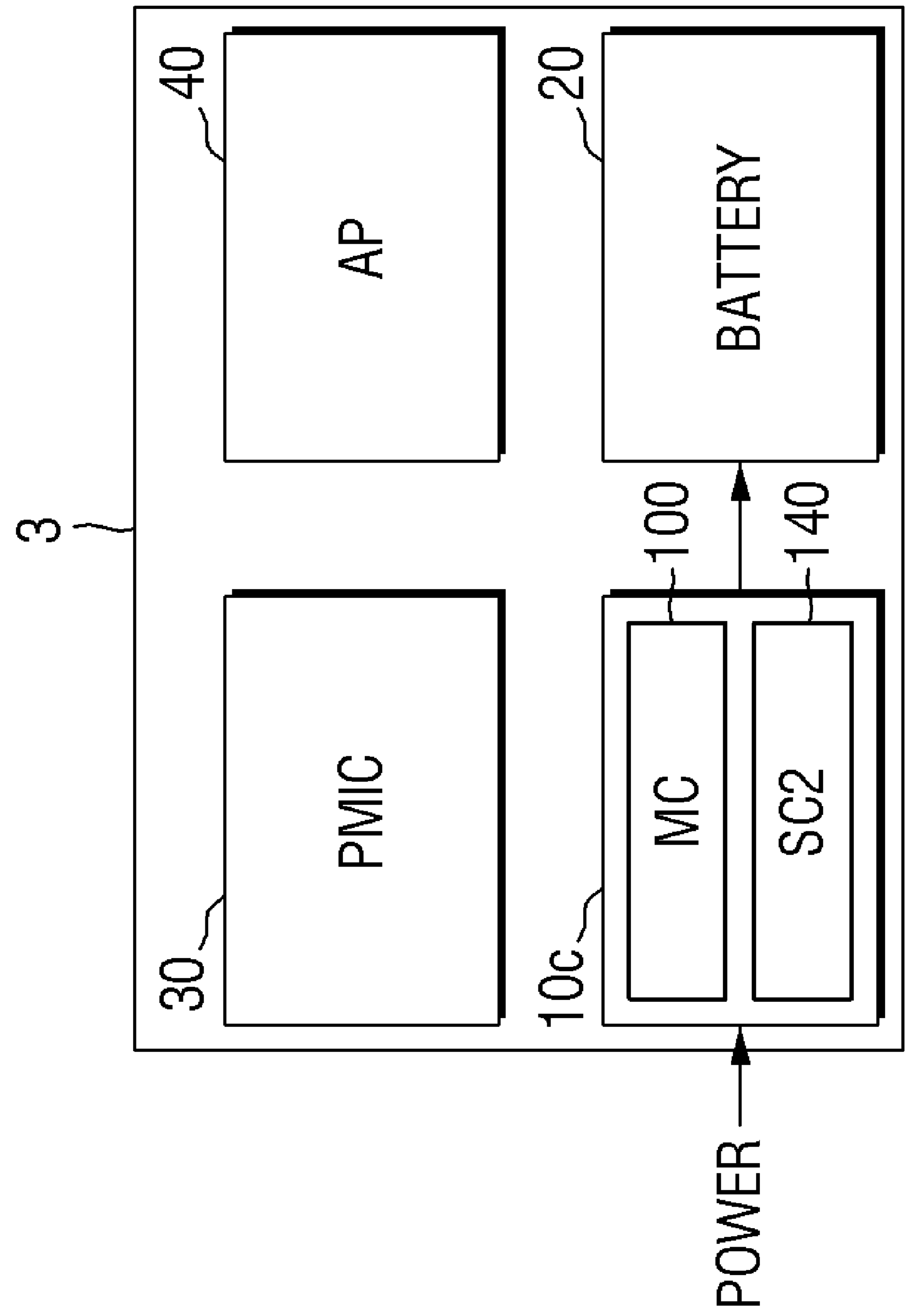
FIG. 9 is a block diagram of a semiconductor system according to still another example embodiment.

FIG. 9 is a block diagram of a semiconductor system according to still another example embodiment.

Referring to FIG. 9, a semiconductor system 3 may include a semiconductor device 10*c*, a battery 20, a PMIC 30, and an AP 40.

The example embodiment of FIG. 9 will hereinafter be described, focusing mainly on differences from the example embodiment of FIG. 1.

The semiconductor device 10*c* may be provided with power from an external source, and includes a main charger (MC) 100 and a second sub-charger (SC2) 140, both of which are configured to charge the battery 20.

The main charger 100 and the second sub-charger 140 may operate in parallel. For example, the main charger 100 may perform charging on the battery 20 first, and then the second sub-charger 140 may perform charging on the battery 20 separately. While the second sub-charger 140 is performing charging on the battery 20, the main charger 100 may terminate the charging of the battery 20.

Figure 10:
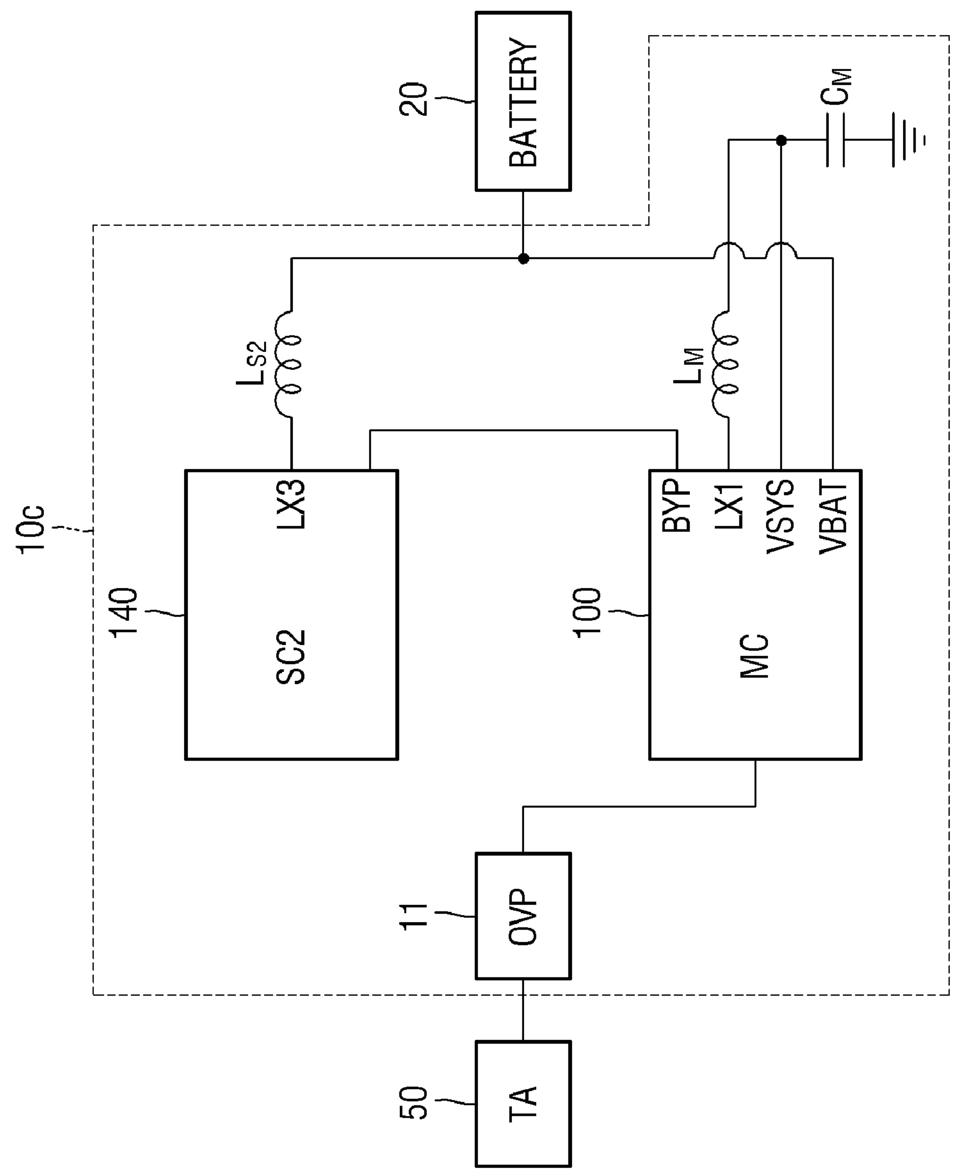
FIG. 10 is a block diagram of a semiconductor device according to still another example embodiment.

FIG. 10 is a block diagram of a semiconductor device according to still another example embodiment.

Referring to FIG. 10, a semiconductor device 10*c* may be provided with power from a TA 50, and include an OVP circuit 11, a main charger (MC) 100, a first inductor $L_M$, a second sub-charger (SC2) 140, and a third inductor $L_{S2}$.

As mentioned earlier with reference to FIG. 2, the OVP circuit 11 may not be provided depending on the purpose of implementation of the semiconductor device 10*b*, or may be provided at a different location from that illustrated in FIG. 10.

The main charger 100 may include a plurality of terminals. For example, the main charger 100 may include a terminal providing a first voltage $V_{TA}$ provided from the TA 50 to a first node LX1 through the OVP circuit 11, a terminal connected to a second node VSYS, which receives a second voltage $V_{SYS}$ from the first node LX1 through the first inductor $L_M$, a terminal outputting a third voltage $V_{BAT}$ for charging the battery 20, and a terminal transmitting the first voltage $V_{TA}$ provided from the TA 50 to the second charger 140 through a fifth node BYP.

The second node VSYS may be connected to a load (e.g., the PMIC 30).

The second sub-charger 140 may include at least one terminal. For example, the second sub-charger 140 includes a terminal providing the first voltage $V_{TA}$ provided from the main charger 100 through the fifth node BYP to a sixth node LX3.

The voltage output from the sixth node LX3 may be provided to the battery 20 through the third inductor $L_{S2}$, which is connected between the sixth node LX3 and a third node VBAT.

The semiconductor device 10*c* may alternately perform switching charging and direct charging. For example, the semiconductor device 10*c* may perform switching charging, including normal charging and fast charging, and then may perform direct charging if a desired (or alternatively, predetermined) set of conditions are met. The operation of the semiconductor device 10*c* will hereinafter be described with reference to FIGS. 11 and 12.

Figure 11:
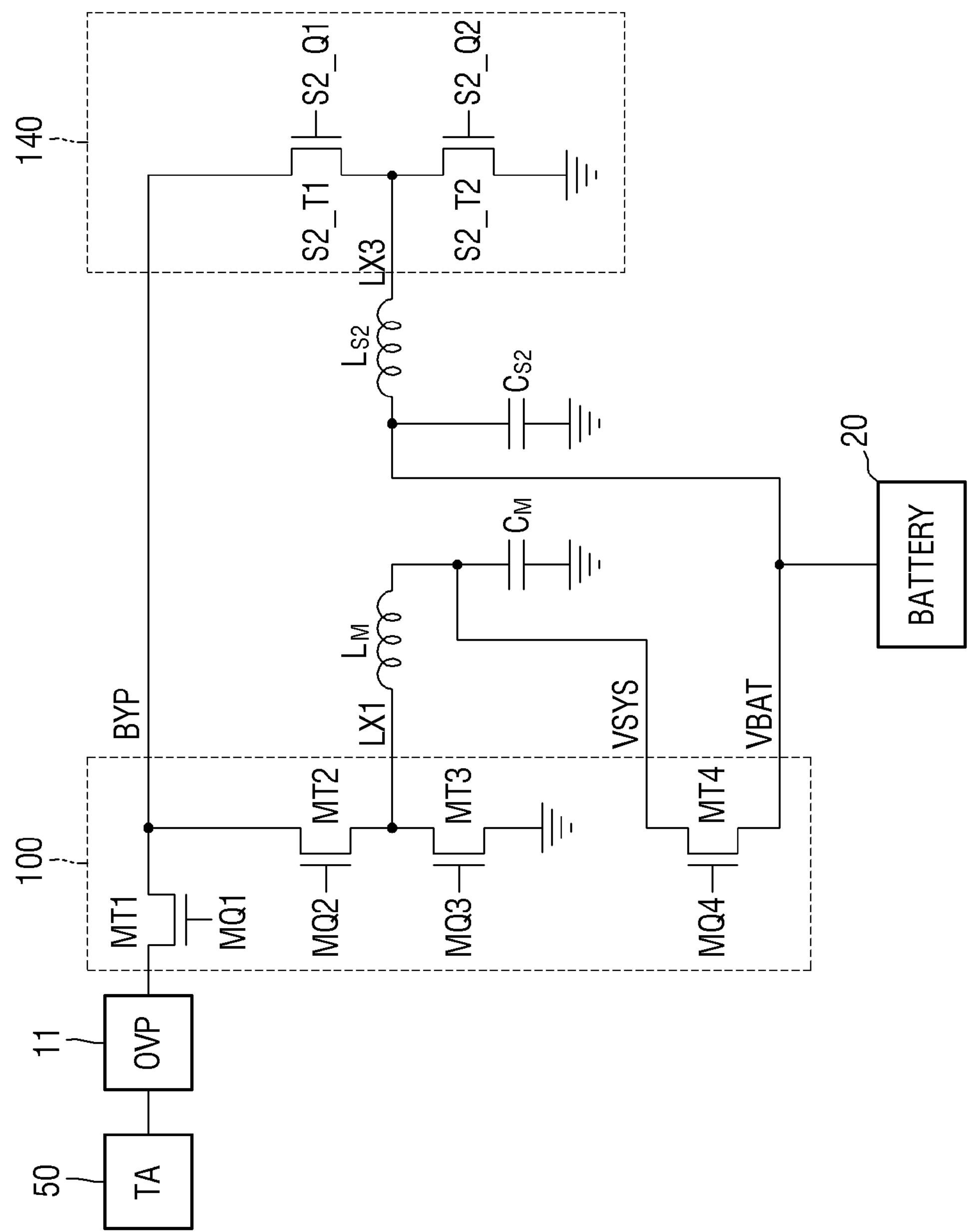
FIG. 11 is a circuit diagram of the semiconductor device of FIG. 10 according to an example embodiment.
Figure 12:
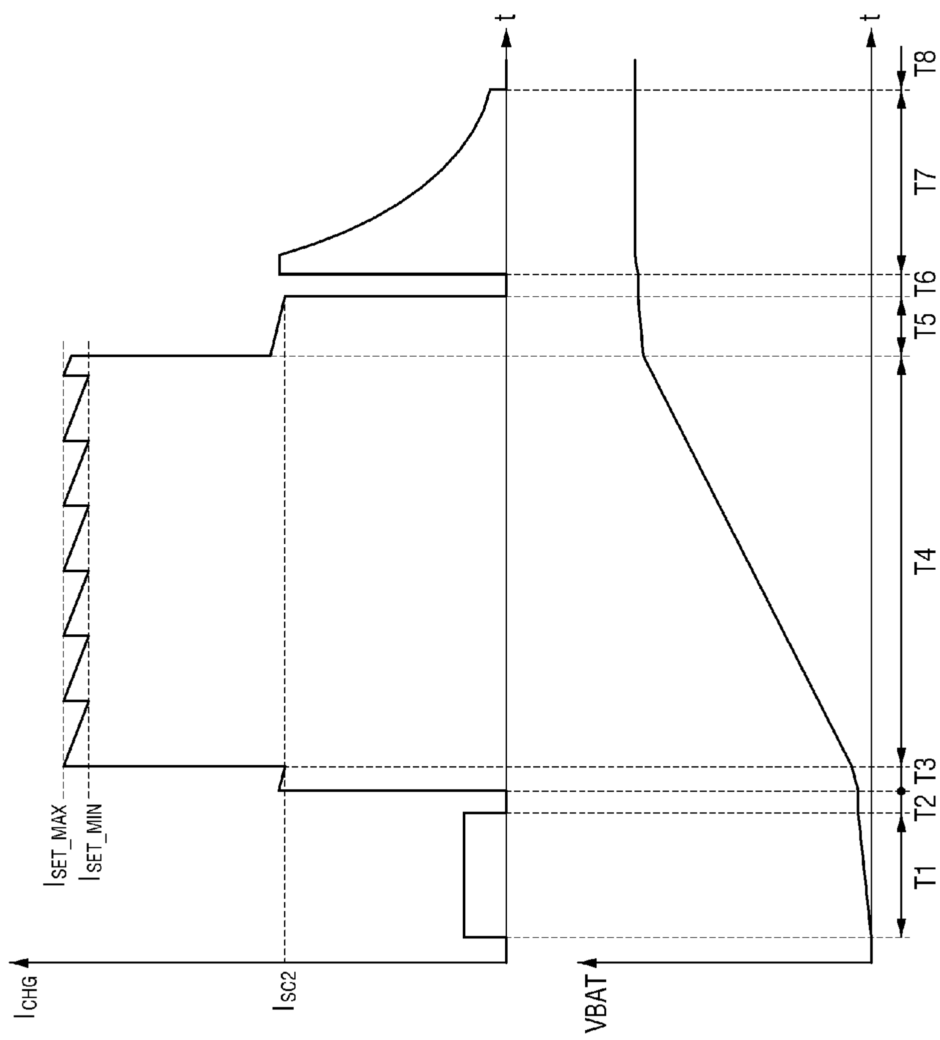
FIG. 12 is a diagram illustrating an operation of the semiconductor device of FIG. 10 according to an example embodiment.

FIG. 11 is a circuit diagram of the semiconductor device of FIG. 10 according to an example embodiment. FIG. 12 is a diagram illustrating an operation of the semiconductor device of FIG. 10 according to an example embodiment.

Referring to FIG. 11, the main charger 100 may include a first transistor MT1, a second transistor MT2, a third transistor MT3, and a fourth transistor MT4.

The first and second transistors MT1 and MT2 may be gated by signals MQ1 and MQ2, respectively, and may provide the first voltage $V_{TA}$ provided from the TA 50 to the first node LX1. The first and second transistors MT1 and MT2 may be connected in series with each other.

The third transistor MT3 may be connected in series with, the second transistor MT2. The third transistor MT3 may be gated by a signal MQ3 and may provide a ground voltage to the first node LX1.

The fourth transistor MT4 may receive the second voltage $V_{SYS}$ from the first inductor $L_M$, which is connected to the first node LX1, through the second node VSYS. The fourth transistor MT4 may be gated by a signal MQ4 and may provide the second voltage $V_{SYS}$ to the third node VBAT as the third voltage $V_{BAT}$ for charging the battery 20.

A current provided from the TA 50 may be delivered to the battery 20 through the first transistor MT1, the second transistor MT2, the first inductor $L_M$, and the fourth transistor MT4, thereby charging the battery 20.

The second sub-charger 140 may include an eighth transistor S2_T1 and a ninth transistor S2_T2.

The eighth transistor S2_T1 may be gated by a signal S2_Q1, and may provide the first voltage $V_{TA}$ provided from the fifth node BYP to the sixth node LX3.

The ninth transistor S2_T2 may be connected in series with the eighth transistor S2_T1. The ninth transistor S2_T2 may be gated by a signal S2_Q2, and may provide a ground voltage to the sixth node LX3.

The current provided from the TA 50 may be delivered to the battery 20 through the first transistor MT1, the eighth transistor S2_T1, and the third inductor $L_{S2}$, thereby charging the battery 20.

The first voltage $V_{TA}$ provided from the TA 50 may be adjusted by the AP 40, and the main charger 100 and the second sub-charger 140 may operate as direct chargers for directly charging the battery 20 using an adjusted first voltage $V_{TA}$.

For example, the main charger 100 may operate as a switching charger, which charges the battery 20 in a switching charging manner, by controlling the signals MQ2 and MQ3 to turn on the second and third transistors MT2 and MT3. Further, the main charger 100 may operate as a direct charger using a variable first voltage $V_{TA}$ by controlling the signals MQ1 through MQ4 to turn on the first, second, and fourth transistors MT1, MT2, and MT4 and to turn off the third transistor MT3, and thereby directly connecting the TA 50 and the battery 20.

The second sub-charger 140 may operate as a switching charger, which charges the battery 20 in a switching charging manner, by controlling the signals S1_Q1 and S1_Q2 to turn on the eighth and ninth transistors S2_T1 and S2_T2. Further, the second sub-charger 140 may operate as a direct charger using a variable first voltage $V_{TA}$ by controlling the signals MQ1, S2_Q1, and S2_Q3 to turn on the first and eighth transistors MT1 and S2_T1 and turn off the ninth transistor S2_T2, and thereby directly connecting the TA 50 and the battery 20.

In a case where the main charger 100 and the second sub-charger 140 both perform direct charging on the battery 20, a charging current provided to the battery 20 may include a first charging current, provided through a first path along the first transistor MT1, the second transistor MT2, the first inductor $L_M$, and the fourth transistor MT4, and a second charging current, provided through a second path along the first transistor MT1, the eighth transistor S2_T1, and the third inductor $L_{S2}$.

Referring to FIG. 12, during a period T1, the semiconductor device 10*c* may perform switching charging using normal charging and fast charging. Accordingly, a charging current $I_{CHG}$ may be supplied to the battery 20, and as a result, the battery voltage $V_{BAT}$ of the battery 20 may increase.

During the period T1, the AP 40 may determine whether the battery voltage $V_{BAT}$ of the battery 20 is within a directly chargeable range.

For example, the AP 40 may determine whether the battery 20 is directly chargeable, based on whether the battery voltage $V_{BAT}$ of the battery 20 is in the range of voltages between a desired (or alternatively, predetermined) minimum battery voltage $VBAT_{SET\_MIN}$ and a desired (or alternatively, predetermined) maximum battery voltage $VBAT_{SET\_MAX}$.

During a period T2, in response to the battery voltage $V_{BAT}$ of the battery 20 being determined to be within the directly chargeable range, the AP 40 may prepare for direct charging of the battery 20 by operating the main charger 100 and initializing the first voltage $V_{TA}$ provided from the TA 50.

In some example embodiments, the AP 40 may set the first voltage $V_{TA}$ provided from the TA 50 to be as high as the battery voltage $V_{BAT}$ of the battery 20.

During periods T3 through T5, the main charger 100 may perform direct charging on the battery 20. While the main charger 100 is performing direct charging on the battery 20, the AP 40 may continue to adjust the first voltage $V_{TA}$ provided from the TA 50.

For example, if an input current $I_{IN}$ provided from the TA 50 is lower than a desired (or alternatively, predetermined) minimum current $I_{SET\_MIN}$, the first voltage $V_{TA}$ may be raised. On the other hand, if the input current $I_{IN}$ provided from the TA 50 is higher than a desired (or alternatively, predetermined) maximum current $I_{SET\_MAX}$, the first voltage $V_{TA}$ may be lowered.

In another example, if the sum of a charging current $I_{CHG}$ provided to the battery 20 and a load current $I_{SYS}$ provided to the second node VSYS is lower than the desired (or alternatively, predetermined) minimum current $I_{SET\_MIN}$, the first voltage $V_{TA}$ may be raised. On the other hand, if the sum of the charging current $I_{CHG}$ provided to the battery 20 and the load current $I_{SYS}$ provided to the second node VSYS is higher than a desired (or alternatively, predetermined) maximum current $I_{SET\_MAX}$, the first voltage $V_{TA}$ may be lowered.

During the period T4, the second sub-charger 140 may also perform direct charging on the battery 20. While the second sub-charger 140 is performing direct charging on the battery 20, the AP 40 may also continue to adjust the first voltage $V_{TA}$ provided from the TA 50. Then, in response to the charging voltage of the second sub-charger 140 reaching a desired (or alternatively, predetermined) maximum battery voltage $VBAT_{SET\_MAX}$, the AP 40 may end direct charging performed by the second sub-charger 140 by terminating the operation of the second sub-charger 140. In this case, the operation of the main charger 100 may not be terminated.

Thereafter, during a period T6, in response to the charging voltage of the main charger 100 reaching the desired (or alternatively, predetermined) maximum battery voltage $VBAT_{SET\_MAX}$, the AP 40 may end direct charging performed by the main charger 100 by terminating the operation of the main charger 100. Then, the semiconductor device 10*c* may be switched back to a switching charging mode.

During a period T7, constant voltage charging or constant current charging may be performed on the battery 20. During a period T8, the charging of the battery 20 may be completed.

In this manner, the generation of heat during battery charging can be reduced by using both direct charging and switching charging, and battery charging time can be reduced by performing direct charging with the use of multiple chargers.

Figure 13:
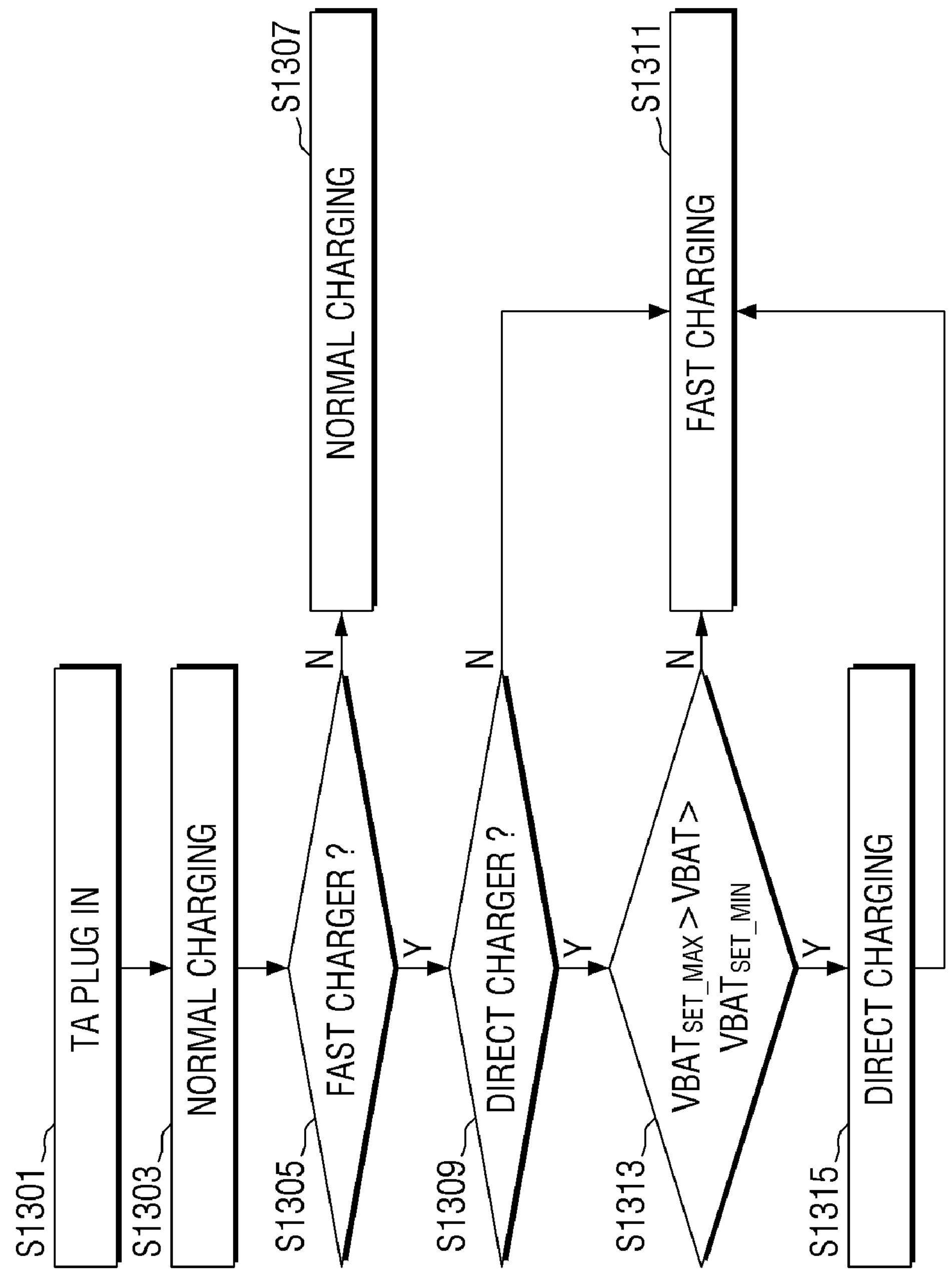
FIGS. 13 through 15 are flowcharts illustrating an operating method of a semiconductor device according to an example embodiment.
Figure 14:
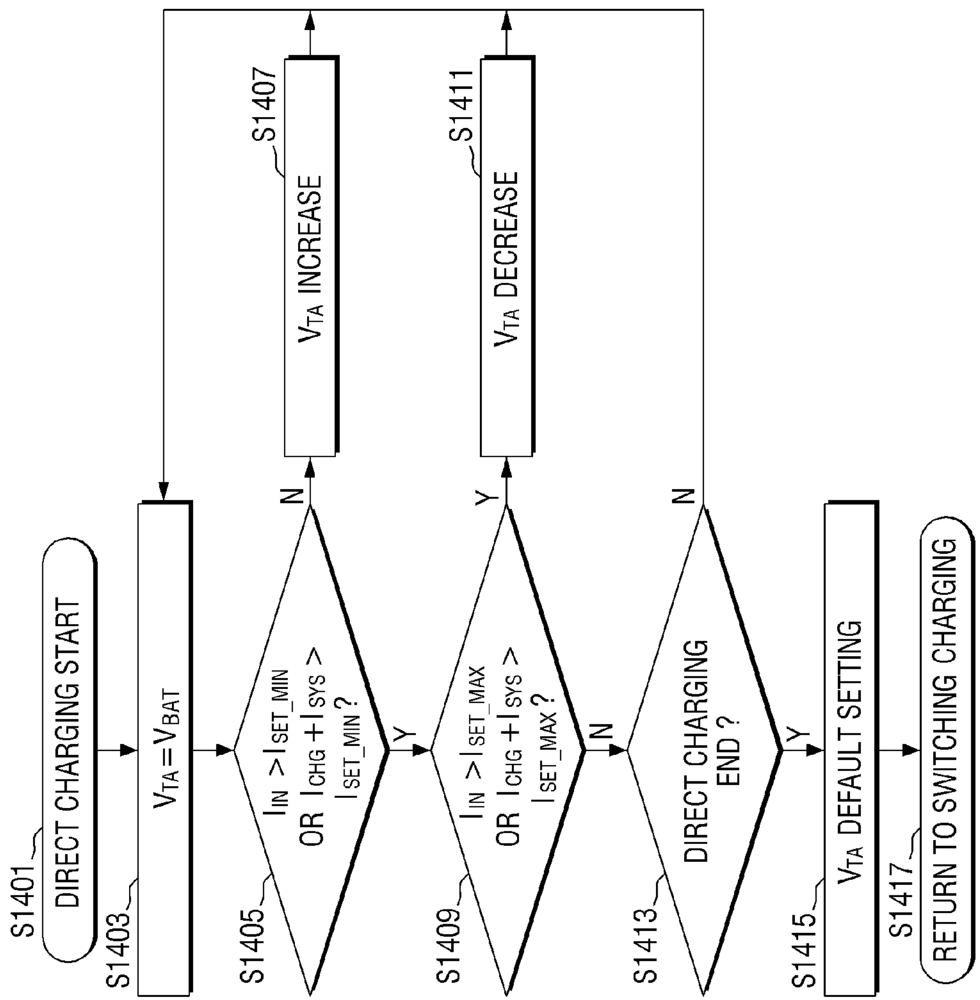
Figure 15:
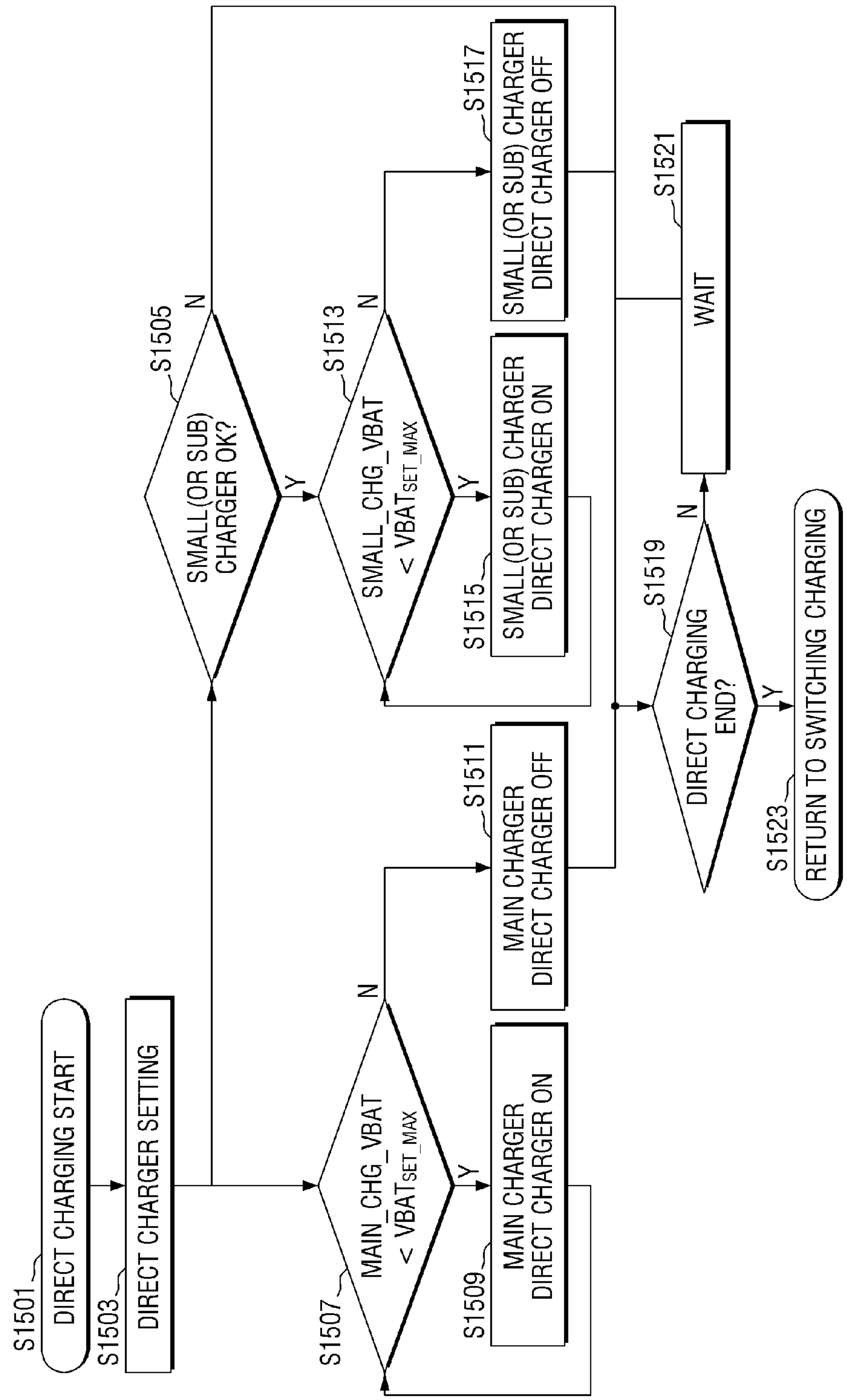

FIGS. 13 through 15 are flowcharts illustrating an operating method of a semiconductor device according to an example embodiment.

An operating method of a semiconductor device according to an example embodiment will hereinafter be described with reference to FIG. 13.

Referring to FIG. 13, a TA 50 may be plugged in to a semiconductor device (S1301).

The semiconductor device may start normal charging (S1303).

An AP 40 may determine whether the TA 50 is a fast charger (S1305). In a case where the TA 50 is not a fast charger (S1305, N), the semiconductor device continues to perform normal charging (S1307). On the other hand, in a case where the TA 50 is a fast charger (S1305, Y), the operating method proceeds to S1309.

The AP 40 may determine whether the TA 50 is a direct charger (S1309). In a case where the TA 50 is not a direct charger (S1309, N), the semiconductor device performs fast charging (S1311). On the other hand, in a case where the TA 50 is a direct charger (S1309, Y), the operating method proceeds to S1313.

The AP 40 may determine whether to perform direct charging (S1313), based on whether a battery voltage $V_{BAT}$ of a battery 20 is within the range of voltages between a desired (or alternatively, predetermined) minimum battery voltage $VBAT_{SET\_MIN}$ and a desired (or alternatively, predetermined) maximum battery voltage $VBAT_{SET\_MAX}$. In a case where the battery voltage $V_{BAT}$ of the battery 20 does not fall within the range of voltages between the desired (or alternatively, predetermined) minimum battery voltage $VBAT_{SET\_MIN}$ and the desired (or alternatively, predetermined) maximum battery voltage $VBAT_{SET\_MAX}$ (S1313, N), the operating method proceeds to S1311, and the semiconductor device performs fast charging on the battery 20. In a case where the battery voltage $V_{BAT}$ of the battery 20 falls within the range of voltages between the desired (or alternatively, predetermined) minimum battery voltage $VBAT_{SET\_MIN}$ and the desired (or alternatively, predetermined) maximum battery voltage $VBAT_{SET\_MAX}$ (S1313, Y), the operating method proceeds to S1315, and the semiconductor device performs direct charging on the battery 20.

Once direct charging performed in S1315 is complete, the operating method proceeds to S1311, and the semiconductor device performs fast charging.

S1315 will be described later with reference to FIGS. 14 and 15.

Referring to FIG. 14, direct charging of the battery 20 begins (S1401).

S1403 through S1411 correspond to steps of performing direct charging, and S1413 is a step where a determination is made as to whether direct charging is complete.

For example, the AP 40 may set a first voltage $V_{TA}$ provided from the TA 50 to a level of the battery voltage $V_{BAT}$ of the battery 20 (S1403).

The AP 40 may adjust the first voltage $V_{TA}$ provided from the TA 50 (S1405 and S1409).

For example, in a case where an input current $I_{IN}$ provided from the TA 50 is not higher than a desired (or alternatively, predetermined) minimum current $I_{SET\_MIN}$ or the sum of a charging current $I_{CHG}$ provided to the battery 20 and a load current $I_{SYS}$ provided to a second node VSYS is not higher than the desired (or alternatively, predetermined) minimum current $I_{SET\_MIN}$ (S1405, N), the first voltage $V_{TA}$ provided from the TA 50 may be raised (S1407).

In a case where the input current $I_{IN}$ provided from the TA 50 is higher than a desired (or alternatively, predetermined) maximum current $I_{SET\_MAX}$ or the sum of the charging current $I_{CHG}$ provided to the battery 20 and the load current $I_{SYS}$ provided to the second node VSYS is higher than a desired (or alternatively, predetermined) maximum current $I_{SET\_MAX}$ (S1409, Y), the first voltage $V_{TA}$ provided from the TA 50 may be lowered (S1411).

A determination may be made as to whether direct charging of the battery 20 is complete (S1413). Then, when it is determined that direct charging of the battery 20 is complete (S1413, Y), the operating method proceeds to S1415, and the first voltage $V_{TA}$ is set to a default level.

Then, the semiconductor device returns to switching charging (S1417). In some example embodiments, S1417 may correspond to S1311 of FIG. 13.

Thereafter referring to FIG. 15, direct charging begins (S1501). The AP 40 may prepare for direct charging of the battery 20 by, for example, initializing the first voltage $V_{TA}$ provided from the TA 50 (S1503).

The AP 40 may determine whether to operate the main charger 100 (S1507) based on whether a charging voltage MAIN_CHG_BAT of the main charger 100 is lower than the desired (or alternatively, predetermined) maximum battery voltage $VBAT_{SET\_MAX}$. In a case where the charging voltage MAIN_CHG_BAT of the main charger 100 is lower than the desired (or alternatively, predetermined) maximum battery voltage $VBAT_{SET\_MAX}$ (S1507, Y), the main charger 100 is operated to perform direct charging (S1509). In a case where the charging voltage MAIN_CHG_BAT of the main charger 100 is not lower than the desired (or alternatively, predetermined) maximum battery voltage $VBAT_{SET\_MAX}$ (S1507, N), the operation of the main charger 100 is terminated (S1511).

A determination is made as to whether there exists another charger (S1505). In a case where there exists another charger such as a first or second sub-charger 120 or 140 (S1505, Y0, the AP 40 determines whether to operate the first or second sub-charger 120 or 140 based on whether a charging voltage SMALL_CHG_BAT of the first or second sub-charger 120 or 140 is lower than the desired (or alternatively, predetermined) maximum battery voltage $VBAT_{SET\_MAX}$ (S1513). In a case where the charging voltage SMALL_CHG_BAT of the first or second sub-charger 120 or 140 is lower than the desired (or alternatively, predetermined) maximum battery voltage $VBAT_{SET\_MAX}$ (S1513, Y), the first or second sub-charger 120 or 140 is operated to perform direct charging (S1515). On the other hand, in a case where the charging voltage SMALL_CHG_BAT of the first or second sub-charger 120 or 140 is not lower than the desired (or alternatively, predetermined) maximum battery voltage $VBAT_{SET\_MAX}$ (S1513, N), the operation of the first or second sub-charger 120 or 140 is terminated (S1517).

Once direct charging is complete (S1519), the semiconductor device returns to switching charging (S1523). In some example embodiments, S1523 may correspond to S1311 of FIG. 13.

In order to return to switching charging, direct charging performed by the main charger 100 and direct charging performed by the first or second sub-charger 120 or 140 both need to be terminated. Thus, a determination is made as to whether both direct charging by the main charger 100 and direct charging by the first or second sub-charger 120 or 140 are terminated (S1519). In a case where direct charging performed by the main charger 100 is terminated, but direct charging performed by the first or second sub-charger 120 or 140 is yet to be terminated, or in a case where direct charging performed by the main charger 100 is also yet to be terminated, the semiconductor device needs to wait (S1521).

In this manner, the generation of heat during battery charging can be reduced by using both direct charging and switching charging, and battery charging time can be reduced by performing direct charging with the use of multiple chargers.

While the present disclosure has been particularly shown and described with reference to some example embodiments thereof, it will be understood by those of ordinary skill in the art that various changes in form and details may be made therein without departing from the spirit and scope of the present disclosure as defined by the following claims. It is therefore desired that the present embodiments be considered in all respects as illustrative and not restrictive, reference being made to the appended claims rather than the foregoing description to indicate the scope of the present disclosure.

What is claimed is:

1. A semiconductor device comprising:

first and second transistors configured to provide a first voltage to a first node, the first voltage being a voltage provided from a travel adaptor (TA);

a third transistor connected in series with the second transistor and configured to provide a ground voltage to the first node;

a fourth transistor configured to receive a second voltage from a first inductor connected to the first node, and provide the second voltage to a second node as a third voltage for charging a battery connected thereto;

fifth and sixth transistors configured to provide the first voltage provided from the TA to a third node; and a seventh transistor connected in series with the sixth transistor and configured to provide the ground voltage to the third node.

2. The semiconductor device of claim 1, wherein the semiconductor device is configured to supply a current provided from the TA to the battery through the first transistor, the second transistor, the first inductor, and the fourth transistor.

3. The semiconductor device of claim 1, wherein the semiconductor device is configured to provide a voltage output from the third node to the battery through a second inductor that is connected between the third node and the second node.

4. The semiconductor device of claim 3, wherein the semiconductor device is configured to supply a current provided from the TA to the battery through the fifth transistor, the sixth transistor, and the second inductor.

5. The semiconductor device of claim 3, wherein a charging current provided to the battery includes at least one of a first charging current or a second charging current, the first charging current being a current provided through a first path along the first transistor, the second transistor, the first inductor, and the fourth transistor, and the second charging current being a current provided through a second path along the fifth transistor, the sixth transistor, and the second inductor.

6. The semiconductor device of claim 1, wherein the semiconductor device is configured to, initially set the first voltage provided from the TA to a battery voltage of the battery, if an input current provided from the TA is lower than a first threshold current, raise a value of the first voltage, and if the input current provided from the TA is higher than a second threshold current, lower the value of the first voltage.

7. The semiconductor device of claim 1, wherein the semiconductor device is configured to, initially set the first voltage provided from the TA to a battery voltage of the battery, if a sum of a charging current provided to the battery and a load current provided to the second node is lower than a first threshold current, raise a value of the first voltage, and if the sum of the charging current and the load current is higher than a second threshold current, lower the value of the first voltage.

8. The semiconductor device of claim 1, wherein the semiconductor device configured to, turn on the second and third transistors to perform switching charging on the battery, and turn on the first, second, and fourth transistors and turn off the third transistor to perform direct charging on the battery.

9. A semiconductor device comprising:

first and second transistors configured to provide a first voltage to a first node, the first voltage being a voltage provided from a travel adaptor (TA);

a third transistor connected in series with the second transistor and configured to provide a ground voltage to the first node;

a fourth transistor configured to receive a second voltage from a first inductor connected to the first node, and provide the second voltage to a second node as a third voltage for charging a battery connected thereto;

a fifth transistor configured to provide the first voltage provided from the TA by way of the first transistor to a third node;

a sixth transistor connected in series with the fifth transistor and configured to provide the ground voltage to the third node; and a seventh transistor connected in series with the sixth transistor and configured to provide a ground voltage to the third node.

10. The semiconductor device of claim 9, wherein the semiconductor device is configured to provide a voltage output from the third node to the battery through a second inductor that is connected between the second node and the third node.

11. The semiconductor device of claim 10, wherein the semiconductor device is configured to supply a current provided from the TA to the battery through the first transistor, the fifth transistor, and the second inductor.

12. The semiconductor device of claim 10, wherein a charging current provided to the battery includes at least one of a first charging current or a second charging current, the first charging current being a current provided though a first path along the first transistor, the second transistor, the first inductor, and the fourth transistor, and the second charging current being a current provided through a second path along the first transistor, the fifth transistor, and the second inductor.

13. A semiconductor device, comprising:

a first charger configured to perform direct charging on a battery using a first voltage provided from an external power source; and a second charger configured to perform direct charging on the battery, in parallel to the first charger, using the first voltage provided from the external power source, wherein the first charger and the second charger are connected to the external power source, wherein the first voltage is raised or lowered under a control of an external device, wherein the first charger includes, first and second transistors configured to provide the first voltage to a first node, the first voltage being a voltage provided from the external power source, a third transistor connected in series with the second transistor and configured to provide a ground voltage to the first node, and a fourth transistor configured to receive a second voltage from a first inductor connected to the first node, and provide the second voltage to a second node as a third voltage for charging the battery connected thereto, and wherein the second charger includes, fifth and sixth transistors configured to provide the first voltage supplied by the external power source to a third node, and a seventh transistor connected in series with the sixth transistor and configured to provide a ground voltage to the third node.

14. The semiconductor device of claim 13, wherein the semiconductor device is configured to provide a voltage output from the third node to the battery through a second inductor that is connected between the third node and the second node.

15. The semiconductor device of claim 13, wherein the second charger is configured to, turn on the fifth and sixth transistors to perform switching charging on the battery, and turn on the fifth and sixth transistors and turn off the seventh transistor to perform direct charging on the battery.

16. The semiconductor device of claim 13, wherein the second charger further includes, the fifth transistor configured to provide the first voltage supplied by the external power source by way of the first transistor to a third node, and the sixth transistor connected in series with the fifth transistor and configured to provide a ground voltage to the third node.

17. The semiconductor device of claim 16, wherein the second charger is configured to, turn on the fifth and sixth transistors to perform switching charging on the battery, and turn on the first and fifth transistors and turn off the sixth transistor to perform direct charging on the battery.

* * * * *